United States Patent [19]

Iwata et al.

[11] Patent Number: 4,612,901
[45] Date of Patent: Sep. 23, 1986

[54] ENGINE IGNITION TIMING CONTROL APPARATUS

[75] Inventors: Toshio Iwata; Satoshi Komurasaki; Atsushi Ueda, all of Himeji, Japan

[73] Assignee: Mitsubishi Denki Kabushiki Kaisha, Tokyo, Japan

[21] Appl. No.: 707,948

[22] Filed: Mar. 4, 1985

[30] Foreign Application Priority Data

Mar. 7, 1984 [JP] Japan .................................. 59-46116
Mar. 17, 1984 [JP] Japan .................................. 59-51825

[51] Int. Cl.$^4$ .............................................. F02P 5/15
[52] U.S. Cl. ................................................ 123/425
[58] Field of Search ..................... 123/425, 435; 73/35

[56] References Cited

U.S. PATENT DOCUMENTS 3,822,583 7/1974 Keller et al. .
4,344,400 8/1982 Asano ............................. 123/435 X
4,463,565 8/1984 Rydquist et al. ............... 123/425 X

FOREIGN PATENT DOCUMENTS 27886 2/1983 Japan .................................. 123/425
57072 4/1983 Japan .

Primary Examiner—Tony M. Argenbright
Attorney, Agent, or Firm—Leydig, Voit & Mayer, Ltd.

[57] ABSTRACT

An ignition timing control apparatus for an internal combustion engine in which the reference ignition timing of the engine is changed over or displaced according to the detected result of the occurrence of knocks owing to the kind of fuel being used for the engine. Either in the change-over determination or the displacement magnitude determination, the change-over magnitude of the reference ignition timing is initialized at a predetermined retard angle.

16 Claims, 12 Drawing Figures

ENGINE IGNITION TIMING CONTROL APPARATUS

BACKGROUND OF THE INVENTION

This invention relates to an ignition timing control apparatus for an internal combustion engine, and in particular to an ignition timing control apparatus for an internal combustion engine which is operable either with a low-octane rating fuel or a high-octane rating fuel, or with a mixture thereof.

It is well known in the art that the octane rating of fuel gasoline is greatly interrelated with a knock-resistibility in an internal combustion engine. Namely, as the octane rating of gasoline becomes higher, the knocking of an engine correspondingly decreases.

Figure 1:
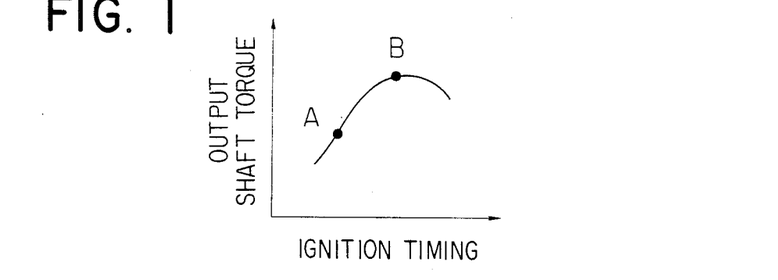
FIG. 1 shows an output shaft torque characteristic of an internal combustion engine as a function of ignition timing.

FIG. 1 shows an ignition timing vs output shaft torque characteristic in an internal combustion engine in the case where a commercially available low-octane gasoline (regular gasoline) and a commercially available high octane gasoline (premium gasoline) of which the octane rating is higher than that of low-octane gasoline. In the figure, point A indicates a knock limit for low-octane gasoline, and point B indicates a knock limit for high-octane gasoline, in which knock arises when the angle of the ignition timing is advanced beyond these points.

According to FIG. 1, it is possible to advance the angle of the ignition timing up to a point B when high-octane gasoline is used, where the output shaft torque will be higher as compared with the use of low-octane gasoline.

Thus, in an engine associated with such a characteristic, in the case where regular and premium gasolines are alternatively used and the ignition timing of the engine is changed over to have an optimum value according to the kind of gasoline in use, or in the case where a mixture of both gasolines is used and the ignition timing is advanced corresponding to the mixing ratio of regular and premium gasolines, the output of the engine can be enhanced.

However, in a conventional control apparatus for an internal combustion engine, the reference ignition timing characteristic is preset only for a predetermined octane rating gasoline, e.g. the low-octane rating regular gasoline. Therefore, when gasoline of the engine is changed over from low octane rating gasoline to high octane rating gasoline or when a mixture of both gasolines is used, an increase in the output of the engine can not be expected without any change or modification thereof, so that the presetting of the reference ignition timing must be repeated towards an advance angle, by some method.

Particularly, such a repeated presetting of the reference ignition timing is very difficult to achieve when using a mixture of both gasolines because, as shown in FIG. 1, the knock limit moves between curves A and B in relation to the mixture ratio and, accordingly, the advance angle limit is variable.

Further, at the initial operation of the engine, intensive knocks may disadvantageously arise depending on the initial setting of the ignition timing of the engine.

U.S. Pat. No. 3,822,583, titled "Method for Determining Octane Rating of Fuels under Road Conditions" discloses measuring the octane rating of a fuel being used for an engine by the detection of knocks.

Japanese Patent Application Laid-open No. 58-57072, published on Apr. 5, 1983, titled "Method for Controlling Ignition Timing of Electronic Controlled Engine" discloses a change-over ignition timing control apparatus for an engine depending on the octane rating of a fuel being used.

SUMMARY OF THE INVENTION

It is accordingly an object of the invention to provide an ignition timing control apparatus for an internal combustion engine wherein the kind of gasoline being used for the engine is determined to change over the reference ignition timing of the engine according to the knock condition as well as the operating condition of the engine, the interval of the ignition timing control for suppressing the occurrence of knocks is shortened to enhance the responsiveness of the ignition timing control apparatus according to the determined result, and the change-over mode at the initial operation is set to a predetermined retard angle to preclude intensive knocks at the initiation of the change-over.

In order to accomplish this object, an ignition timing control apparatus for an internal combustion engine according to the present invention comprises: a sensing means for sensing vibrations including knocks in the engine; knock signal deriving means for deriving knock signals from the outputs of said sensing means; a retard controlling voltage generator for determining an ignition timing correction magnitude for suppressing the occurrence of knocks an ignition timing change-over determining means for determining whether or not the change-over of the reference ignition timing to a corrrected ignition timing is necessary from the knock condition, associated with a fuel used for the engine, provided by the knock signal deriving means; an initializing means for initializing the output of the ignition timing change-over determining means corresponding to a predetermined retard angle whereby the ignition timing is set at the predetermined retard angle for an initial period; and an ignition timing change-over means for changing over the reference ignition timing.

The ignition timing change-over determining means preferably includes a first comparing means for comparing the output of the retard controlling voltage generator with a first predetermined threshold level set higher than the output of the retard controlling voltage generator when a premium gasoline is used, and a second comparing means for comparing the output of the retard controlling voltage generator with a second predetermined threshold level set higher than the output of the retard controlling voltage generator when premium gasoline is used. The ignition timing change-over determining means may further include a pressure sensor for sensing the inlet air pressure of the engine, an operating region determining means responsive to the outputs of the pressure sensor and the ignition timing change-over means for determining the operating region of the engine, a first multiplication means for logically multiplying the outputs of the first comparing means and the operating region determining means, and a second multiplication means for logically multiplying the outputs of the second comparing means and the operating region determining means. The ignition timing change-over determining means may further include a bistable means having the setting input thereof connected to the output of the first multiplication means and having the resetting input thereof connected to the output of the second multiplication means. The bistable means may comprise an OR gate for logically summing the outputs of the first multiplication means and the initializing means, and a flip-flop having the setting input thereof connected to the output of the OR gate and having the resetting input thereof connected to the second multiplication means.

It is another object of this invention to provide an ignition timing control apparatus for an internal combustion engine wherein an ignition timing displacement magnitude based on the mixture ratio of premium and regular gasolines is determined according to the knock condition as well as the operating condition of the engine, whereby the reference ignition timing is controlled to its optimum angle, and the displacement magnitude at the initial operation is set to a predetermined retard angle to preclude intensive knocks at the initiation of the change-over.

In order to accomplish this object, an ignition timing control apparatus for an internal combustion engine according to the present invention comprises: a sensing means (1) for sensing vibrations including knocks in the engine; knock signal deriving means for deriving knock signals from the outputs of said sensing means; a displacement magnitude determining means for determining from the output of the knock signal deriving means a displacement magnitude for the reference ignition timing of the engine to suppress the engine knocks; an initializing means for initializing the displacement magnitude corresponding to a predetermined retard angle whereby the ignition timing is initially set at said predetermined retard angle; and an ignition timing displacement means for displacing the reference ignition timing by the displacement magnitude according to the output of the displacement magnitude determining means.

The displacement magnitude determining means preferably includes a retard controlling voltage generator, a first comparing means for comparing the output of the retard controlling voltage generator with a first predetermined threshold level to displace the reference ignition timing in a retarding direction when the output of the retard controlling voltage generator is above the first predetermined threshold level, and a second comparing means for comparing the output of the retard controlling voltage generator with a second predetermined threshold level to displace the reference ignition timing in an advancing direction when the output of the retard controlling voltage generator is below the second predetermined threshold level. The displacement magnitude determining means may further include a pressure sensor for sensing the inlet air pressure of the engine, an operating parameter determining means, responsive to the outputs of the pressure sensor and the ignition timing displacement means for determining the operating region of the engine, a first multiplication means for logically multiplying the outputs of the first comparing means and the operating region determining means, and a second multiplication means for logically multiplying the outputs of the second comparing means and the operating region determining means. The displacement magnitude determining means may further include an integrating means having an advancing input thereof connected to the output of the first multiplication means and having the retarding input thereof connected to the output of the second multiplication means.

The integrating means preferably includes a capacitor the output of which serves as the output of the integrating means, an analog switch activated by the initializing circuit, a DC voltage source, and means for discharging the capacitor when the output of the first multiplication means becomes high, for charging the capacitor when the output of the second multiplication means becomes high, and for fixing the voltage at a predetermined level of the DC voltage source when the analog switch is activated by the initializing circuit.

The operating region determining means may comprise a superposed map of two operating regions of the engine in which knocks may be filtered out in the reference ignition timings of both of the premium and regular gasolines.

BRIEF DESCRIPTION OF THE DRAWINGS

FIGS. 3a-c show waveform graphs for explaining the operation of the knock signal deriving portion in FIG. 2;

Throughout the figures, the same reference numerals indicate identical or corresponding portions and elements.

DETAILED DESCRIPTION OF THE PREFERRED EMBODIMENTS

The present invention will now be described in detail along the preferred embodiments illustrated in the accompanying drawings.

Figure 2:
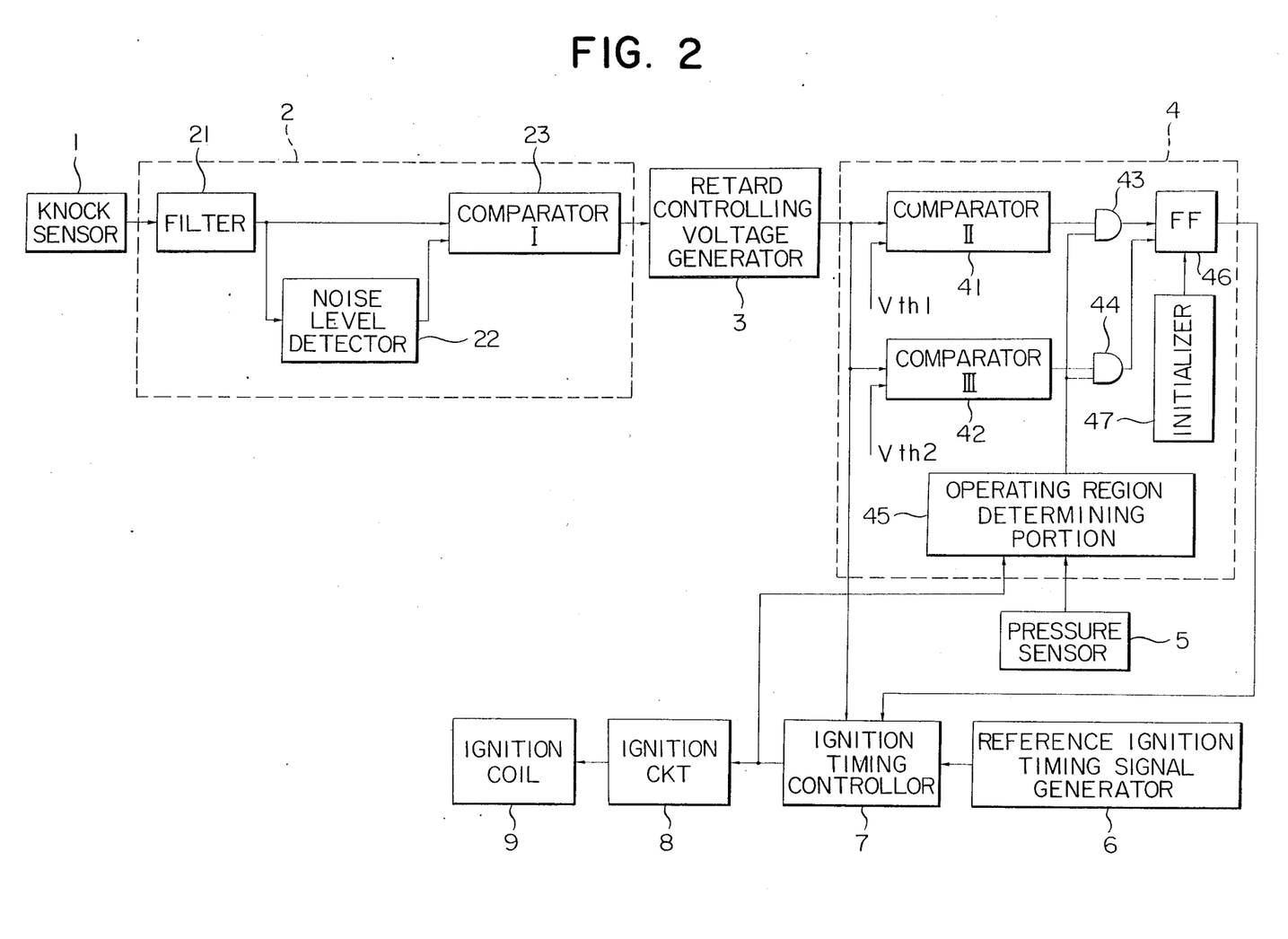
FIG. 2 shows a block diagram of a first embodiment of an ignition timing control apparatus for an internal combustion engine in accordance with this invention.

FIG. 2 shows a first embodiment of this invention, where a knock sensor 1 is mounted on an internal combustion engine (not shown) to sense knocks in the engine. The output signal of the knock sensor 1 is received as an input by a knock signal deriving portion 2, enclosed with dotted lines, and including a bandpass filter 21, a noise level detector 22, and a first comparator 23. The input of the bandpass filter 21 is connected to the knock sensor 1 and the output thereof is connected to the noise level detector 22 and one input of the first comparator 23. The output of the noise level detector 22 is connected to the other input of the first comparator 23.

The output of the knock signal deriving portion 2 is connected to the input of a retard controlling voltage generator 3. The output of the retard controlling voltage generator 3 is connected to the input of a reference ignition timing change-over determining portion 4 which is composed of second and third comparators 41 and 42, AND gates 43 and 44, an operating region determining portion 45, a flip-flop 46, and an initializing circuit 47. The second and third comparators 41 and 42 compare the output voltage of the retard controlling voltage generator 3 with predetermined threshold levels Vth1 and Vth2, respectively, the compared results being provided to respective one input terminals of the AND gates 43 and 44. The operating region determining portion 45 has two inputs one of which is connected to the output of a pressure sensor 5 for sensing the inlet air pressure of the engine and the other of which is connected to the output of an ignition timing controller 7 as will be described later, and has one output which is connected to the other input terminals of the AND gates 43 and 44. The set terminal of the flip-flop 46 is connected to the output of the AND gate 43 and the reset terminal of same is connected to the output of the AND gate 44. This flip-flop also has a preset input terminal, for initializing its output level at a high level, connected to the output of the initializing circuit 47.

The output of the flip-flop 46 in the ignition timing change-over determining portion 4 and the output of the retard controlling voltage generator 3 are connected to first and second inputs of the aforementioned ignition timing controller 7 a third input of which is connected to the output of a reference ignition timing signal generator 6 whereby the ignition timing controller 7 phase-shifts the reference ignition timing signal from the reference ignition timing signal generator 6 in accordance with the outputs of the retard controlling voltage generator 3 and the flip-flop 46 and provides as an output therefrom an ignition signal indicative of the ignition timing which is inputed to an ignition circuit 8 which causes an ignition coil 9 to develop thereacross a high voltage necessary for the ignition of the engine.

Figure 3:
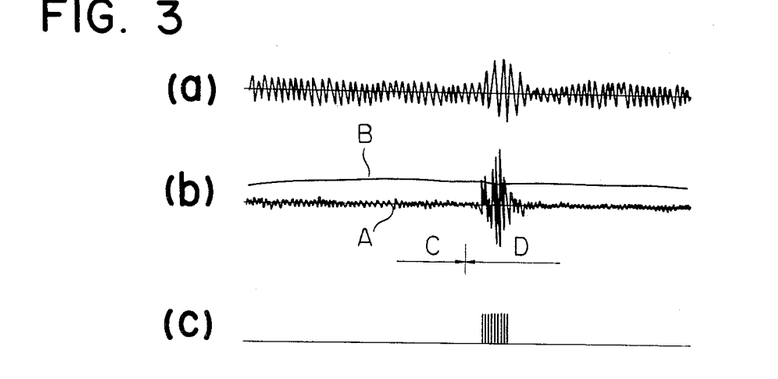
Figure 4:
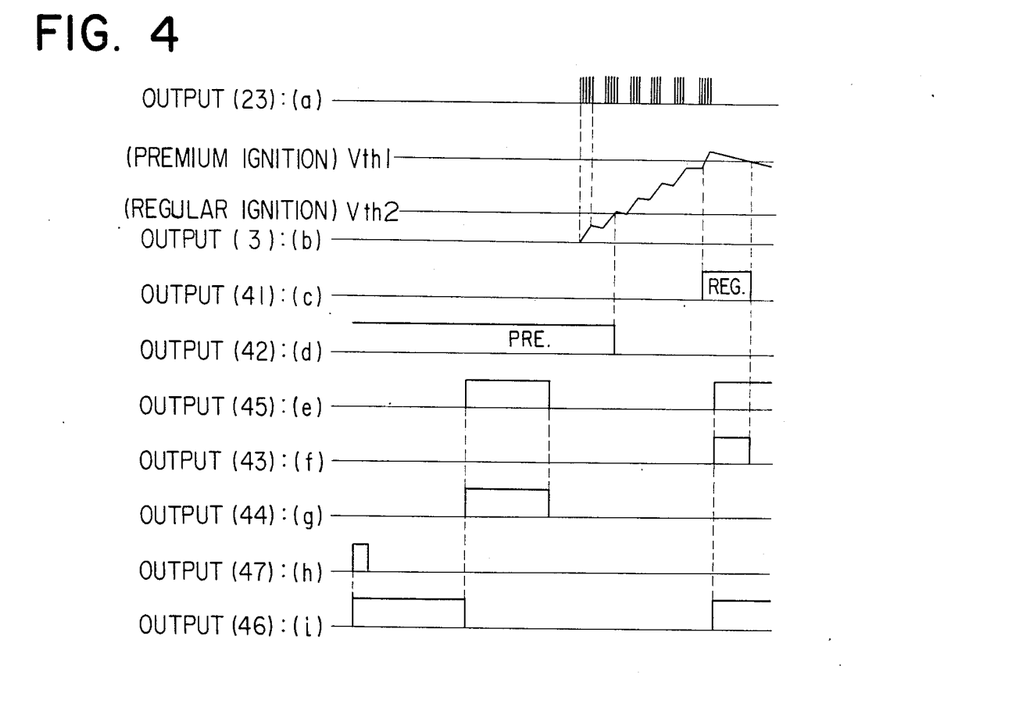
FIG. 4 shows waveform graphs for explaining the operations of the various portions of the control apparatus used in FIG. 2.

The operation of each of the block portions in FIG. 2 will now be described with reference to FIGS. 3 and 4 showing waveforms indicating the operation of each of the circuits.

The knock sensor 1 may comprise a vibration acceleration sensor generally well known as being mounted on the cylinder block (not shown), which converts mechanical vibrations into electrical signals, and which generates a vibration wave signal, as shown in FIG. 3(a), which is received by the bandpass filter 21. The bandpass filter 21 only passes therethrough a frequency component inherent in knocks, from the output signal of the knock sensor 1, thereby suppressing a noise component not relating to knocks to provide as an output a signal having a good S/N ratio as shown in FIG. 3(b) by wave-form A.

The noise level detector 22 may be composed of, e.g. a half-wave rectifying circuit, an averaging circuit, an amplifying circuit etc. The noise level detector 22 converts the output of the bandpass filter 21 (FIG. 3(b), wave-form A) into a DC voltage by the half-wave rectification and the averaging operations, the DC voltage being amplified with a predetermined amplification to have a level, as shown in FIG. 3(b) by a wave-form B, higher than the noise component of the output signal of the bandpass filter 21 (FIG. 3(b), wave-form A) but lower than the knock component of the same.

The comparator 23 compares the output signal of the noise level detector 22 (FIG. 3(b), wave-form B) with the output of the bandpass filter 21 (FIG. 3(b), wave-form A). In the case where no knock occurs (FIG. 3, section C), since the output signal of the bandpass filter 21 (FIG. 3(b), wave-form A) is not greater than the output signal of the noise level detector 22 (FIG. 3(b), wave-form B), the comparator 23 provides no output, while in the case where knocks occur (FIG. 3, section D), since the former signal is greater than the latter signal, the comparator 23 provides as an output therefrom a pulse train as shown in FIG. 3(c). Accordingly, the output pulse train from the comparator 23 can be used for determining whether or not knocks have occurred.

FIG. 4 shows waveforms indicating the operations of the retard controlling voltage generator 3 and the ignition timing change-over determining portioin 4 which includes the second and third comparators 41 and 42, the AND gates 43 and 44, the operating region determining portion 45, the flip-flop 46, and the initializing circuit 47. The retard controlling voltage generator 3 may be composed of e.g. an integration circuit which, when the first comparator 23 provides as an output therefrom a pulse train as shown in FIG. 4(a), integrates the pulse train to raise the output voltage thereof as shown in FIG. 4(b). On the other hand, when the first comparator 23 provides no output pulse train, indicating the absence of knocks, the output of the voltage generator 3 gradually falls at a predetermined rate. Consequently, the voltage generator 3 generates a retard controlling voltage for retarding the ignition timing up to the knock limit point on a real time basis, whereby the ignition timing phase-shifter 7 receives as an input the retard controlling voltage to retard the angle of the ignition timing, thereby suppressing the occurrence of knocks.

The second comparator 41 and the third comparator 42 compare the retard controlling voltage from the signal generator 3 with the threshold levels Vth1 and Vth2 respectively. The voltage relationship between Vth1 and Vth2 is set such that $V_{min} < V_{th2} < V_{th1} < V_{max}$, where Vmax and Vmin respectively represent the maximum value and the minimum value of the retard controlling voltage from the generator 3. The second comparator 41 provides as an output therefrom a high level signal as shown in FIG. 4(c) when the retard controlling voltage from the generator 3 is higher than the first predetermined threshold voltage Vth1. The third comparator 42 provides as an output therefrom a high level signal as shown in FIG. 4(d) when the retard controlling voltage from the generator 3 is lower than the second predetermined threshold voltage Vth2.

The threshold level Vth1 is predetermined such that in the case where the reference ignition timing is set for that of the premium gasoline, the retard controlling voltage does not go above Vth1 when the premium gasoline is used while it does not go below Vth1 when the regular gasoline is used. The threshold level Vth2 is predetermined such that in the case where the reference ignition timing is set for that of the regular gasoline, the retard controlling voltage does not go above Vth2 when the premium gasoline is used while it does not go below Vth2 when the regular gasoline is used. Therefore, accoding to the outputs of the comparators 41 and 42, it is possible to determine which of the premium or the regular gasoline is used for the engine.

Even though such threshold levels Vth1 and Vth2 are preset to determine which of the premium or regular gasoline is used for the engine, this determination can not be necessarily applied to the overall operating region (zone) of the engine because, for example, in a light load region and in a low speed region the retard controlling voltage may erroneously go above Vth1 and Vth2 even when the premium gasoline is used. For the purpose of eliminating such an erroneous determination, the operating region determining portion 45 is provided. The operating region determining portion 45 receives as inputs operating load information of the engine from the pressure sensor 5 and operating speed information of the engine from the ignition timing controller 7 to form a data map for the operating region based on the load and the speed of the engine.

Figure 5:
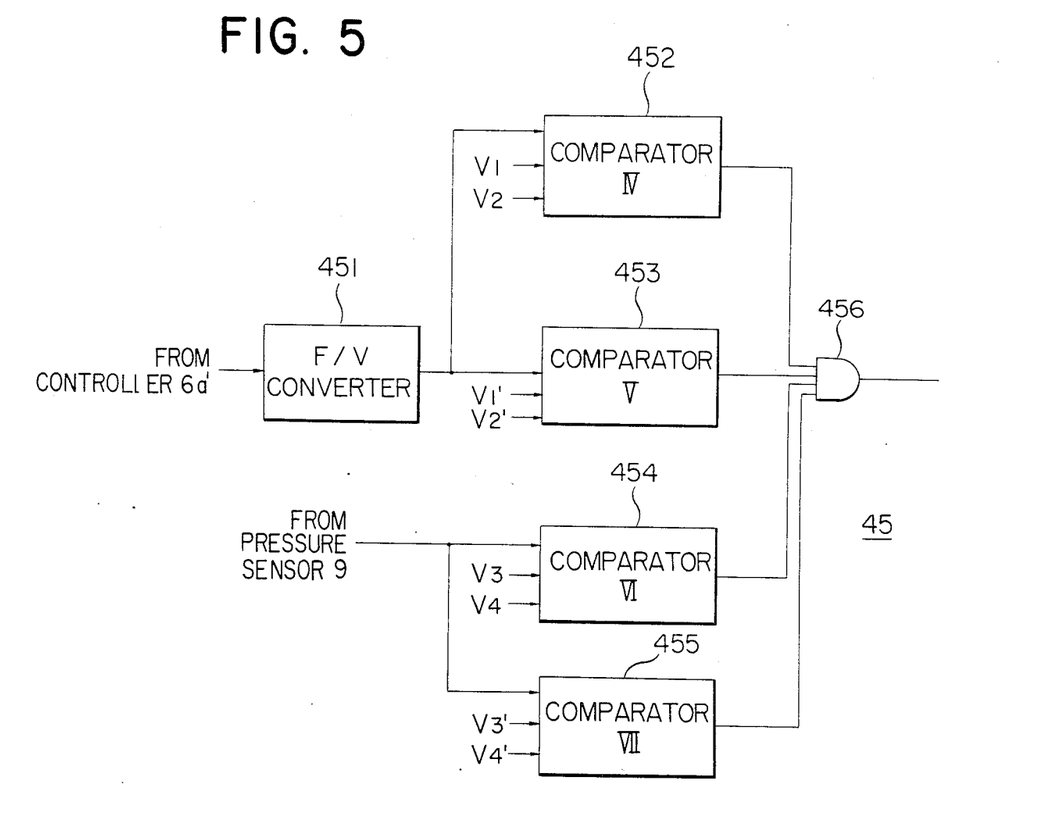
FIG. 5 shows a block diagram of the arrangement of the operating region determining portion used in this invention.

In FIG. 5, there is shown a block diagram of the arrangement of the operating region determining portion 45 which is composed of a frequency-voltage converter 451, a fourth comparator 452, a fifth comparator 453, a sixth comparator 454, a seventh comparator 455, and an AND gate 456. The input of the F/V converter 451 is connected to the output of the ignition timing controller 7 to convert the ignition signal to a voltage in a frequency-voltage conversion fashion, that is to provide as an output therefrom a voltage proportional to the engine speed. The comparator 452 has two threshold levels V1 and V2 connected thereto to be compared with the output voltage of the F/V converter 451. The comparator 453 also has two threshold levels V1' and V2' connected thereto to be compared with the output voltage of the F/V converter 451. Therefore, when the output voltage of the F/V converter 451 is between V1 and V2, the comparator 452 provides as an output therefrom a high level signal while otherwise it provides as an output therefrom a low level signal, and when the output voltage of the F/V converter 451 is between V1' and V2', the comparator 453 provides as an output therefrom a high level signal while otherwise it provides as an output therefrom a low level signal.

The input of the comparator 454 is connected to the output of the pressure sensor 5 to receive as an input a voltage proprotional to the inlet air pressure of the engine, that is the load information of the engine. The comparator 454 also has two threshold levels V3 and V4 connected thereto to be compared with the output voltage of the pressure sensor 5. The input of the comparator 455 is also connected to the output of the pressure sensor 5 to receive as an input a voltage proportional to the inlet air pressure of the engine, that is the load information of the engine. The comparator 455 also has two threshold levels V3' and V4' connected thereto to be compared with the output voltage of the pressure sensor 5. Therefore, when the output voltage of the pressure sensor 5 is between V3 and V4, the comparator 454 provides as an output therefrom a high level signal while otherwise it provides as an output therefrom a low level signal, and when the output voltage of the pressure sensor 5 is between V3' and V4', the comparator 455 provides as an output therefrom a high level signal while otherwise it provides as an output therefrom a low level signal. Then, the AND gate 456 whose inputs are connected to the respective outputs of the comparators 452–455 performs the logical multiplication of the outputs of the comparators 452–455.

Figure 6:
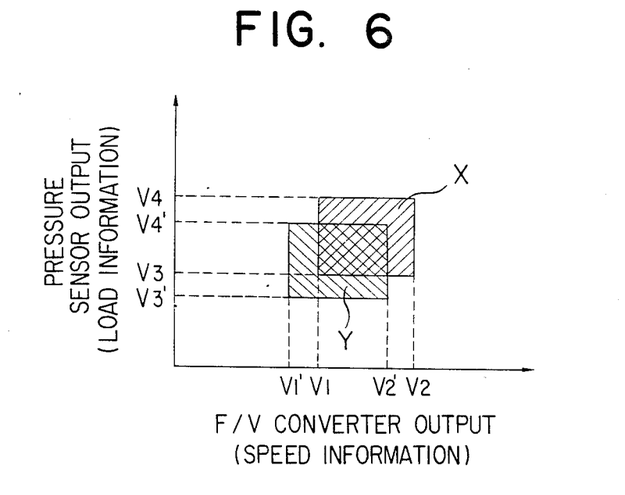
FIG. 6 shows a map of an operating region of the engine defined by the load and speed on the engine, used in this invention.

FIG. 6 shows an operating region of the engine represented by the output voltage of the F/V converter 451 (speed information) and the output voltage of the pressure sensor 5 (load information). It will be seen from FIG. 6 that there are two hatched portions X and Y which are called a "map". The hatched portion X designates an operating region defined by a predetermined speed region of V1–V2 as well as a predetermined load region of V3–V4 with the combination of the comparators 452 and 454 while the hatched portion Y designates an operating region defined by a predetermined speed region of V1'–V2' as well as a predetermined load region of V3'–V4' with the combination of the comparators 453 and 455. Therefore, only if the operating region of the engine lies in the double hatched portion, i.e., the superposed portion of the hatched portions X and Y, does the operating region determining portion 45 provide as an output therefrom a high level signal through the AND gate 456, as shown in FIG. 4(e).

Namely, in the case where the reference ignition timing is initially set for the premium gasoline in the signal generator 6, when the retard controlling voltage exceeds Vth1, indicating that the regular gasoline is being used for the engine and when the operating condition of the engine lies in the double hatched map shown in FIG. 6, the AND gate 43 provides as an output therefrom a high level signal, as shown in FIG. 4(f). On the other hand, in the case where the reference ignition timing is initially set for the regular gasoline in the signal generator 6, when the retard controlling voltage becomes lower than Vth2 indicating that the premium gasoline is used for the engine and when the operating condition of the engine lies in the double hatched map shown in FIG. 6, the AND gate 44 provides as an output therefrom a high level signal, as shown in FIG. 4(g).

Thus, the AND gate 43 or 44 provides as an output therefrom a signal accurately indicative of whether the premium gasoline or regular gasoline is being used for the engine, as a result of the comparison of the retard controlling voltage with Vth1, or Vth2 respectively, and the determination of the operating region of the engine.

Namely, the AND gate 43 for logically multiplying the outputs of the second comparator 41 and the operating region determining portion 45 provides as an output therefrom a signal accurately indicative of whether premium gasoline or regular gasoline is used for the engine in the reference ignition timing for premium gasoline, as a result of the comparison of the retard controlling voltage with Vth1. That is to say, when regular gasoline is used, the output signal of the AND gate 43 becomes the high level as shown in FIG. 4(f). The AND gate 44 for logically multiplying the outputs of the third comparator 42 and the operating region determining portion 45 provides as an output therefrom a signal accurately indicative of whether the premium gasoline or regular gasoline is used for the engine in the reference ignition timing for regular gasoline, as a result of the comparison of the retard controlling voltage with Vth2. That is to say, when premium gasoline is used, the output signal of the AND gate 44 becomes the high level as shown in FIG. 4(g).

The flip-flop 46 is set when the output of the AND gate 43 is at the high level whereby the output of the flip-flop 46 becomes a high level, while the flip-flop 46 is reset when the output of the AND gate 44 is at a high level whereby the output of the flip-flop 46 becomes the low level. The initializing circuit 47 is capable of providing as an output therefrom a pulse at a high level, for example at the starting time of the engine, as shown in FIG. 4(h), whereby the output of the flip-flop 46 is set by the initializing circuit 47 toward a retard angle, providing as an output therefrom a high level signal. The output state of the flip-flop 46 is shown in FIG. 4(i).

At the starting time of the engine, the flip-flop 46 is set by the initializing circuit 47 to provide a high level output signal as above described, which indicates a "regular gasoline mode" in which the ignition timing of the engine has been changed over to the retard side.

Now if the ignition timing is initially set for that of premium gasoline in which the change-over mode is at the advance side and when regular gasoline is being used, the reference ignition timing for premium gasoline as initially set will be largely advanced beyond the ignition timing of knock limit point of the regular gasoline, so that an excessive knock is induced, resulting in a difficulty in the immediate suppression of the occurrence of knocks by means of the retard controlling voltage from the voltage generator 3.

However, in this invention, since the initializing circuit 47 initializes the output of the flip-flop to be at the high level to provide the retard angle change-over mode, the occurrence of knocks can be suppressed by the retard controlling voltage provided as an output from the retard controlling voltage generator 3 even when regular gasoline is used. On the other hand, when premium gasoline is used, because the retard controlling voltage is lower than Vth2 within an operating region to be determined, the AND gate 44 provides as an output therefrom a high level signal as shown in FIG. 4(g), thereby inverting the output of the flip-flop 46 into the low level (premium gasoline mode) as shown in FIG. 4(i). If gasoline in use is changed-over to regular gasoline while the engine is running, the retard controlling voltage goes above Vth1 so that the AND gate 43 provides as an output therefrom a high level signal, as shown in FIG. 4(f), which inverts the output of the flip-flop 46 to the high level (regular gasoline mode) as shown in FIG. 4(i). Therefore, the reference ignition timing change-over determining portion 4 can set the reference ignition timing of the engine to a mode according to the type of gasoline being used in the engine without inducing excessive knocks regardless of whether regular or premium gasoline is being used.

Figure 7:
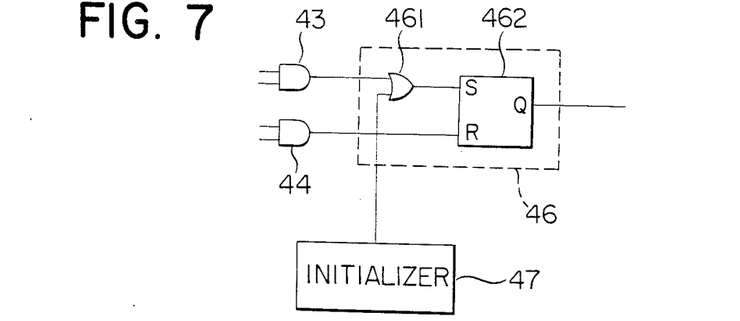
FIG. 7 shows a detailed arrangement of a flip-flop circuit 46 used in FIG. 2.

FIG. 7 shows in greater detail the arrangement of the flip-flop 46. This flip-flop 46 is formed of an OR gate 461 and a RS flip-flop 462. In this example, the RS flip-flop 462 is initialized, i.e., set by the initializing circuit 47 through the OR gate 461 at the retard side.

As mentioned above, the ignition timing change-over determining portion 4 determines, from the output voltage of the retard controlling voltage generator 3, which of premium or regular gasoline is used for the engine.

The ignition timing controller 7 then automatically changes over the reference ignition timing characteristic set in the reference ignition timing signal into the advance side according to the output of the flip-flop 46 when premium gasoline is used while changing over the reference ignition timing characteristic into the retard side when regular gasoline is used. This ignition timing controller 7 is generally well known in the art of ignition timing control apparatus so that the description thereof is omitted. It is to be noted that the reference ignition timing signal generator 6 provides as an output therefrom the reference ignition timing signal set by the operating condition of the engine such as the speed and the load of the engine. This reference ignition timing characteristic may be determined by e.g. the operating characteristics of the centrifugal governer of a distributor and a pressure diaphragm, or may be stored in a memory of an electronic advance controlling device.

According to the first embodiment of this invention as above described, in the case where either of regular gasoline or premium gasoline is interchangeably used for an engine, knocks are detected by a knock sensor, determination is made of whether premium or regular gagsoline is used based on the detected result, and the reference ignition timing characteristic is changed over to that of either one of premium or regular gasoline depending on the determined result, thereby suppressing the occurrence of knocks and improving the drivability of the engine. At the same time, by positioning the initial setting of the change-over control at the retard side, the stability of the engine can be secured without inducing any excessive knocks.

Figure 8:
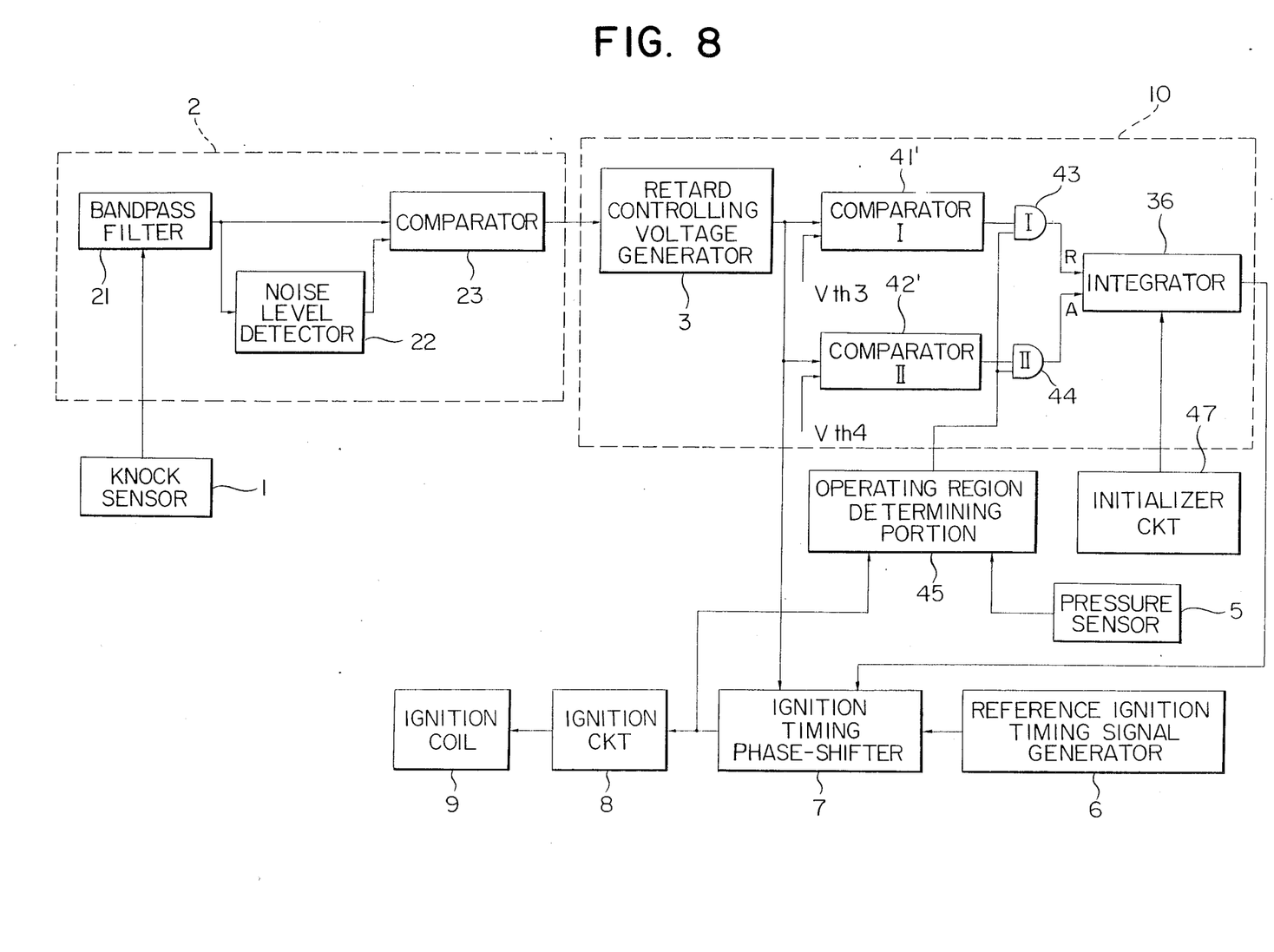
FIG. 8 shows a block diagram of a second embodiment of an ignition timing control apparatus for an internal combustion engine in accordance with this invention.

A second embodiment of an ignition timing control apparatus for an internal combustion engine of this invention applicable to the case of a mixed gasoline is shown in FIG. 8. This second embodiment also serves to shorten the ignition timing interval for the knock control, thereby enhancing the responsiveness of the knock control.

It is seen from FIG. 8 that in the second embodiment of FIG. 8 an integrator 36 is substituted for the flip-flop 46 of the first embodiment of FIG. 2 and the threshold levels Vth3 and Vth4 respectively of a first comparator 41' and a second comparator 42' are different in significance from the threshold levels Vth1 and Vth2 while the remaining arrangements are the same in both embodiments so that the description thereof will not be repeated. However, it is to be noted in this second embodiment that the retard controlling voltage generator 3, the comparators 41' and 42', the AND gates 43 and 44, and the integrator 36 form an ignition timing displacement magnitude determining portion 10 enclosed with a dotted line. Also, the threshold level Vth3 serves to displace the reference ignition timing in the retarding direction when the output of the retard controlling voltage generator 3 becomes higher than Vth3 while the threshold level Vth4 serves to displace the reference ignition timing in the advancing direction when the output of the retard controlling voltage generator 3 becomes lower than Vth4. While the retard controlling voltage lies in a dead band between Vth3 and Vth4, the reference ignition timing is not displaced.

Figure 9:
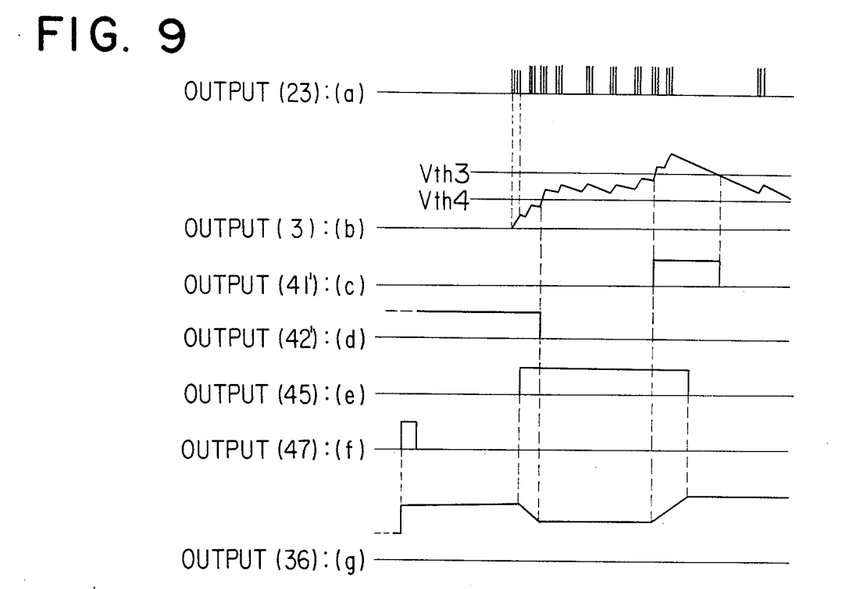
FIG. 9 shows waveform graphs for explaining the operations of the various portions of the control apparatus used in FIG. 8.

In FIG. 9 are shown waveforms observed at the various points of the ignition timing displacement magnitude determining portion 10, in which FIGS. 9(a)–(f) respectively correspond to FIGS. 4(a)–(e) and (h) as shown therein.

In this second embodiment shown in FIG. 8, the integrator 36 included in the displacement magnitude determining portion 10 has three inputs the first of which is connected to the output of the AND gate 43 and serves as a retarding input, the second of which is connected to the output of the AND gate 44 and serves as an advancing input, and the third of which is connected to the output of the initializing circuit 47.

The integrator 36 gradually decreases its output voltage as shown in FIG. 9(g) when the high level output signal of the comparator 42' is provided to the advancing input of the integrator 36 through the AND gate 44, thereby displacing its output in the advancing direction. On the other hand, the integrator 36 gradually increases its output voltage as shown in FIG. 9(g) when the high level output signal of the comparator 41' is provided to the retarding input of the integrator 36 through the AND gate 43, thereby displacing its output in the retarding direction. If the advancing and retarding inputs of the integrator 36 are both at the low level, the output voltage of the integrator 36 is held as it is.

The initializing circuit 47 generates a high level output as shown in FIG. 9(f), for example at the starting time of the engine. In the duration of this initializing pulse, the output voltage of the integrator 36 is fixed at a predetermined level as shown in FIG. 9(g). After the duration of the initializing pulse, the integrator 36 is ready to determine a reference ignition timing displacement magnitude from the above predetermined level, i.e., a predetermined reference ignition timing displacement point.

If the integrator 36 were not initialized but incidentally operated at the advance side, when regular gasoline is used, the initial reference ignition timing would be set too much into the advance angle, namely, beyond the knock limit point of the case where regular gasoline is used. Therefore, intensive knocks would be induced to damage the engine. Although the occurrence of the intensive knocks are immediately suppressed by the retard controlling voltage from the voltage generator 3, the intensive knocks would continue to occur until the retard control has reached the knock limit point due to the retarding responsiveness of the voltage generator 3 shown in FIG. 9(b).

However, if the integrator 36 is initially preset at the retard side as above noted, the initial reference ignition timing will not be advanced beyond the knock limit point, resulting in no intensive knocks.

Figure 10:
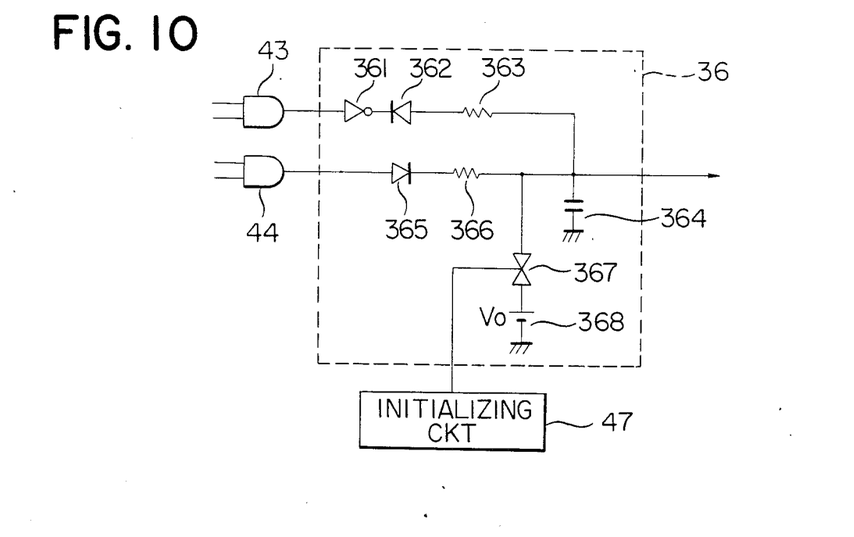
FIG. 10 shows a detailed arrangement of an integrator used in FIG. 8.

FIG. 10 shows in greater detail the combination of the integrator 36 and the initializing circuit 47. The integrator 36 includes an inverter 361, diodes 362 and 365, resistors 363 and 366, a capacitor 364, an analog switch 47, and a power source 368. The initializing circuit 367 is connected to the analog switch 367. In this arrangement, when the output of the AND gate 43 becomes high, the output of the inverter 361 becomes low and discharges the capacitor 364 through the diode 362 and the resistor 363, thereby reducing the output voltage of the integrator 36. On the other hand, when the output of the AND gate 44 becomes high, the capacitor 364 is charged through the diode 365 and the resistor 366. When the output of the initializing circuit 47 becomes high, the analog switch 367 is switched on, thereby fixing the voltage across the capacitor 364 at a predetermined voltage Vo determined by the power source 368, as shown in FIG. 9(g) at the left side.

While the initializing circuit 47 in the above embodiment has been used to generate a pulse at the starting time of the engine, such an initializing pulse may be generated by the detection of the fact that gasoline has been poured into the gasoline tank of the car through the detection of the opening/closing operation of the fuel cap of a gasoline tank upon supplying gasoline or through the detection of the change in the reading of a fuel gauge. In this case, a backup power source may be added so that the output mode of the integrator 36 is memorized even during the stop mode of the engine.

According to the second embodiment as above mentioned, in the case where only either one of premium gasoline or regular gasoline is used or where a mixture of them is used, knocks are detected by a knock sensor, whether or not displacement of the reference ignition timing in the advancing or retarding direction is required is determined from the detected occurrence of knocks, and the reference ignition timing is displaced in angle according to an ignition timing displacement magnitude, while a predetermined displacement magnitude is initially set at the retard side at the initiation of the engine operation, whereby the most efficiently operable ignition timing for the engine is advantageously obtained.

It is to be noted that while the present invention has been described with reference to the above embodiments illustrated in the accompanying drawings, it should not be limited to them and may be applied with various modifications thereof without departing from the spirit of the invention.

What we claim is:

1. An ignition timing control apparatus for an internal combustion engine having a reference ignition timing comprising:
   a sensing means for sensing vibrations including knocks of said engine;
   knock signal deriving means for deriving knock signals from the output of said sensing means;
   a retard controlling voltage generator for determining from said knock signals derived by said knock signal deriving means an ignition timing correction magnitude for suppressing the occurrence of knocks;
   an ignition timing change-over determining means for determining whether or not the change-over of the reference ignition timing to a corrected ignition timing is necessary from the knock condition, associated with a fuel used for said engine, provided by said knock signal deriving means;
   an initializing means for initializing the output of said ignition timing change-over determining means corresponding to a predetermined retard angle whereby the ignition timing is initially set at said predetermined retard angle; and
   an ignition timing change-over means for changing over the reference ignition timing to an ignition timing reflecting a correction magnitude determined by said retard controlling voltage generator.

2. An ignition timing control apparatus for an internal combustion engine having a reference ignition timing comprising:
   a sensing means for sensing vibrations including knocks of said engine;
   knock signal deriving means for deriving knock signals from the output of said sensing means;
   a retard controlling voltage generator for determining from said knock signals derived by said knock signal deriving means an ignition timing correction magnitude for suppressing the occurrence of knocks;
   an ignition timing change-over determining means for determining whether or not the change-over of the reference ignition timing to a corrected ignition timing is necessary from the knock condition, associated with a fuel used for said engine, provided by said knock signal deriving means;
   an initializing means for initializing the output of said ignition timing change-over determining means corresponding to a predetermined retard angle whereby the ignition timing is set at said predetermined retard angle; and
   an ignition timing change-over means for changing over the reference ignition timing to an ignition timing reflecting a correction magnitude determined by said retard controlling voltage generator;
   said ignition timing change-over determining means including a first comparing means for comparing the output of said retard controlling voltage generator with a first predetermined threshold level set higher than the output of said retard controlling voltage generator when premium gasoline is used where the reference ignition timing is set for either one of premium or regular gasoline, and a second comparing means for comparing the output of said retard controlling voltage generator with a second predetermined threshold level set higher than the output of said retard controlling voltage generator when premium gasoline is used where the reference ignition timing is set for the other one of either premium or regular gasoline.

3. An ignition timing control apparatus for an internal combustion engine as claimed in claim 2 wherein said ignition timing change-over determining means further includes a pressure sensor for sensing the inlet air pressure of said engine, an operating region determining means, responsive to the outputs of said pressure sensor and said ignition timing change-over means for determining the operating region of said engine, a first multiplication means for logically multiplying the outputs of said first comparing means and said operating region determining means, and a second multiplication means for logically multiplying the outputs of said second comparing means and said operating region determining means.

4. An ignition timing control apparatus for an internal combustion engine as claimed in claim 3 wherein said ignition timing change-over determining means further includes a bistable means having the setting input thereof connected to the output of said first multiplication means and having the resetting input thereof connected to the output of said second multiplication means.

5. An ignition timing control apparatus for an internal combustion engine as claimed in claim 4 wherein said bistable means comprises an OR gate for logically summing the outputs of said first multiplication means and said initializing means, and a flip-flop having the setting input connected to the output of said OR gate and having the resetting input connected to the second multiplication means.

6. An ignition timing control apparatus for an internal combustion engine as claimed in claim 5 wherein said operating region determining means comprises a superposed map of two operating regions of said engine in which knocks may be filtered out in the reference ignition timings of both of the premium and regular gasolines.

7. An ignition timing control apparatus for an internal combustion engine as claimed in claim 6 wherein said ignition timing change-over means includes a reference ignition timing signal generator for generating the reference ignition timing as a preset signal, and an ignition timing controller for phase-shifting the reference ignition timing according to the output of said flip-flop and the output of said retard controlling voltage generator, the output of said ignition timing controller being connected to the input of said operationg region determining means.

8. An ignition timing control apparatus for an internal combustion engine as claimed in claim 7 wherein said ignition timing change-over means further includes an ignition circuit connected to said phase-shifting means, and an ignition coil caused by said ignition circuit to develop thereacross an ignition voltage.

9. An ignition timing control apparatus for an internal combustion engine having a reference ignition timing comprising:

a sensing means for sensing vibrations including knocks of said engine;

a knock signal deriving means for deriving knock signals from the output of said sensing means;

a displacement magnitude determining means for determining from the output of said knock signal deriving means a displacement magnitude for the reference ignition timing of said engine to suppress the engine knocks;

an initializing means for initializing the displacement magnitude corresponding to a predetermined retard angle whereby the ignition timing is set at said predetermined retard angle; and an ignition timing displacement means for displacing the reference ignition timing by said displacement magnitude according to the output of said displacement magnitude determining means.

10. An ignition timing control apparatus for an internal combustion engine having a reference ignition timing comprising:

a sensing means for sensing vibrations including knocks of said engine;

a knock signal deriving means for deriving knock signals from the output of said sensing means;

a displacement magnitude determining means for determining from the output of said knock signal deriving means a displacement magnitude for the reference ignition timing of said engine to suppress the engine knocks;

an initializing means for initializing the displacement magnitude corresponding to a predetermined retard angle whereby the ignition timing is set at said predetermined retard angle; and an ignition timing displacement means for displacing the reference ignition timing by said displacement magnitude according to the output of said displacement magnitude determining means;

said displacement magnitude determining means including a retard controlling voltage generator, a first comparing means for comparing the output of said retard controlling voltage generator with a first predetermined threshold level to displace the reference ignition timing in a retarding direction when the output of said retard controlling voltage generator is above said first predetermined threshold level, and a second comparing means for comparing the output of said retard controlling voltage generator with a second predetermined threshold level to displace the reference ignition timing in an advancing direction when the output of said retard controlling voltage generator is below said second predetermined threshold level.

11. An ignition timing control apparatus for an internal combustion engine as claimed in claim 10 wherein said displacement magnitude determining means further includes a pressure sensor for sensing the inlet air pressure of said engine, an operating parameter determining means, responsive to the outputs of said pressure sensor and said ignition timing displacement means for determining the operating region of said engine, a first multiplication means for logically multiplying the outputs of said first comparing means and said operating region determining means, and a second multiplication means for logically multiplying the outputs of said second comparing means and said operating region determining means.

12. An ignition timing control apparatus for an internal combustion engine as claimed in claim 11 wherein said displacement magnitude determining means further includes an integrating means having an advancing input connected to the output of said first multiplication means and having the retarding input connected to the output of said second multiplication means.

13. An ignition timing control apparatus for an internal combustion engine as claimed in claim 12 wherein said integrating means includes a capacitor the output of which serves as the output of said integrating means, an analog switch activated by said initializing circuit, a DC voltage source, and means for discharging said capacitor when the output of said first multiplication means becomes high, for charging said capacitor when the output of said second multiplication means becomes high, and for fixing the voltage across said capacitor at a predetermined level of said DC voltage source when said analog switch is activated by said initializing circuit.

14. An ignition timing control apparatus for an internal combustion engine as claimed in claim 13 wherein said operating region determining means comprises a superposed map of two operating regions of said engine in which knocks may be filtered out in the reference ignition timings of both of premium and regular gasolines.

15. An ignition timing control apparatus for an internal combustion engine as claimed in claim 14 wherein said displacement magnitude means includes a reference ignition timing signal generator for generating the reference ignition timing as a preset signal, and an ignition timing controller for phase-shifting the reference ignition timing according to the output of said integrating means and the output of said retard controlling voltage generator, the output of said ignition timing controller being connected to the input of said operating region determining means.

16. An ignition timing control apparatus for an internal combustion engine as claimed in claim 15 wherein said ignition timing displacement means further includes an ignition circuit connected to said phase-shifting means, and an ignition coil caused by said ignition circuit to develop thereacross an ignition voltage.

* * * * *

UNITED STATES PATENT AND TRADEMARK OFFICE
CERTIFICATE OF CORRECTION

PATENT NO. : 4,612,901

DATED : September 23, 1986

INVENTOR(S) : Iwata et al

It is certified that error appears in the above-identified patent and that said Letters Patent is hereby corrected as shown below:

On the title page:
Item [21] Change "707,948" to --707,949--.

Signed and Sealed this

Twentieth Day of January, 1987

*Attest:*

DONALD J. QUIGG

*Attesting Officer*    *Commissioner of Patents and Trademarks*